Oct. 11, 1932.    R. L. MAPSON    1,881,790
GEAR SHIFT LATCH MECHANISM
Filed Nov. 8, 1928    2 Sheets-Sheet 2
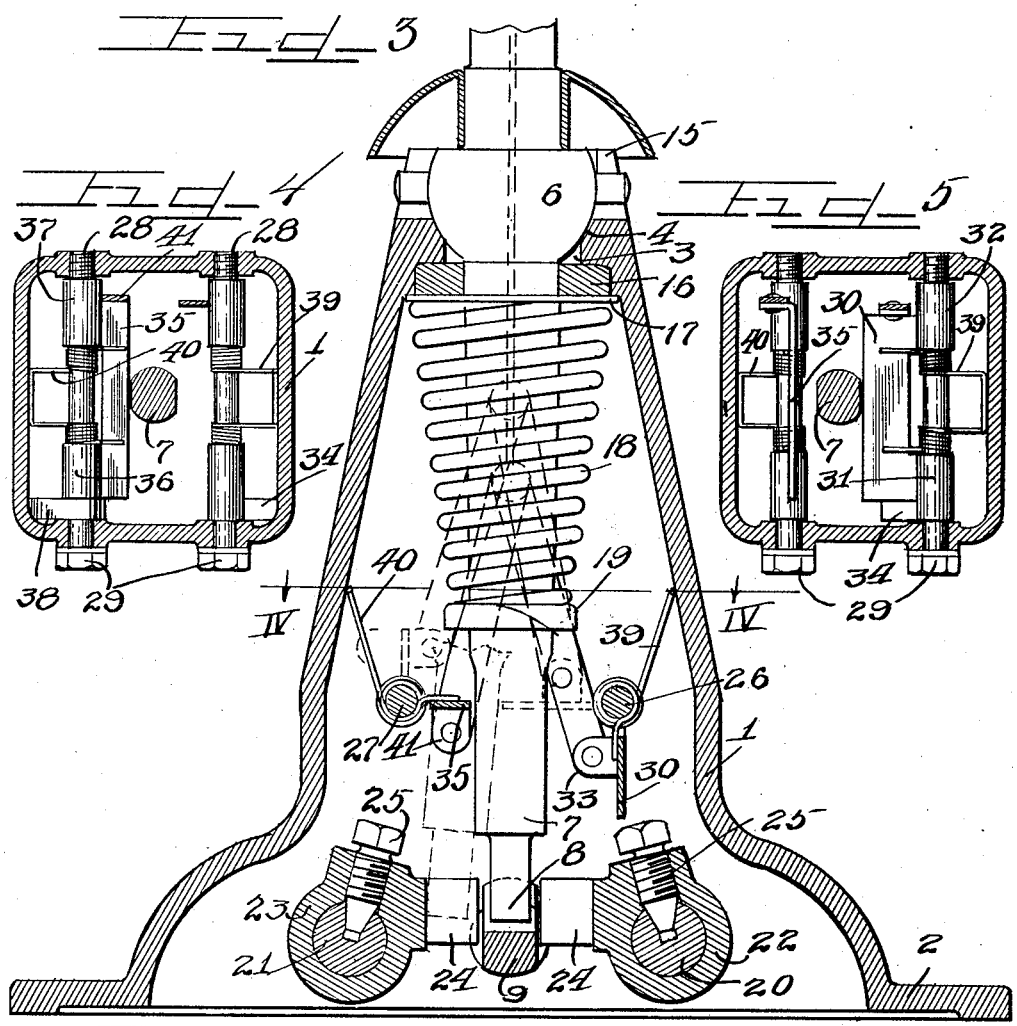
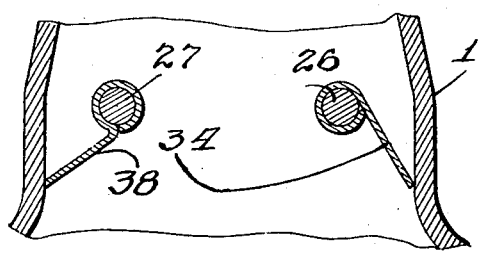
Inventor
Robert Leslie Mapson
by Charles W. Fills
Attys.

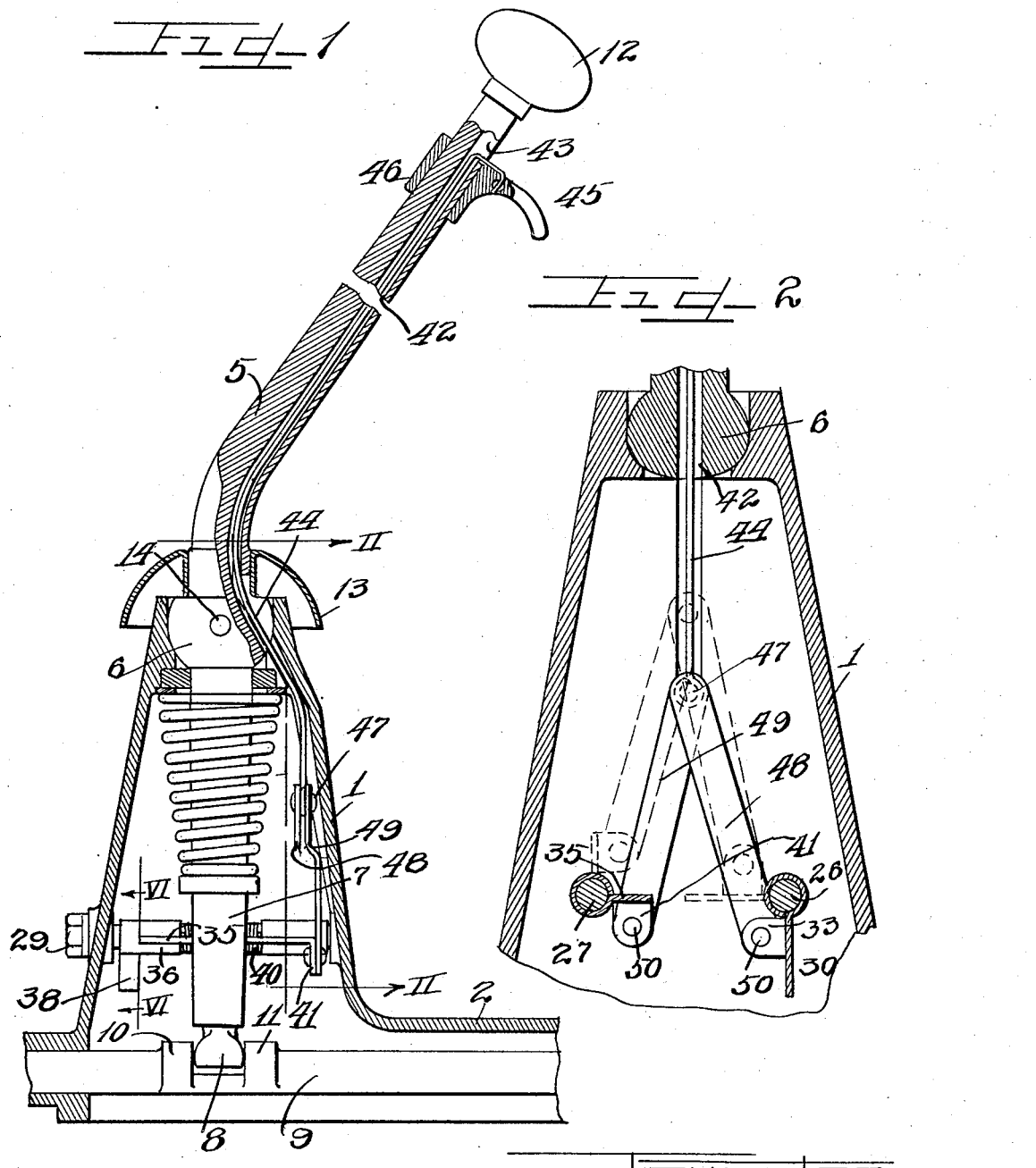

Patented Oct. 11, 1932

1,881,790

UNITED STATES PATENT OFFICE

ROBERT LESLIE MAPSON, OF DETROIT, MICHIGAN, ASSIGNOR TO DETROIT GEAR & MACHINE COMPANY, A CORPORATION OF MICHIGAN

GEAR SHIFT LATCH MECHANISM

Application filed November 8, 1928. Serial No. 318,011.

This invention relates to a gear shift latch mechanism and particularly to a latch mechanism for gear sets or transmissions for automotive vehicles having a fourth gear which is normally ineffective and wherein the latch mechanism is effective to prevent engaging of any other gear than the fourth gear whenever the latch mechanism is actuated to connect said gear in operative relation in the gear set.

There are in use at the present time gear sets or transmissions having fourth gears with latch mechanisms of such nature as to allow engagement of any gear of the gear set whenever the latch is out so that there is a possibility of engaging the wrong gear.

This invention overcomes the objection to such mechanisms now in use in that it provides a latch mechanism so arranged as to prevent the engagement of any gear in the gear set whenever the latch is actuated to connect the fourth gear in driving engagement.

The gear which is normally rendered ineffective by the latch mechanism of this invention will, for the sake of convenience in the terminology, be referred to herein as the fourth gear, but the use of said term is generic and not by way of limitation, as the gear rendered ineffective by the latch mechanism may be a low speed gear or a high speed gear, or any other gear of a transmission or gear set of like character, and, therefore, the use of the term "fourth gear" is to be construed accordingly in the specification and claims.

An object of the invention is to provide a gear shift latch mechanism in which the gear shift lever is locked against engagement with any other gear of the gear set whenever operated for actuation of the fourth gear.

Another object of the invention is to provide a gear shift latch mechanism in which the gear lever is moved into position for engagement with the fourth gear whenever the latch is actuated.

A further object of the invention is to provide a gear shift latch mechanism in which the latch is effective to move the gear shift lever into position for engagement with the fourth gear and also when in such position to prevent engagement of the lever with any other gear of the gear set.

A still further object of the invention is the provision of latching mechanism for gear shift levers normally arranged to actuate certain shiftable elements of transmissions while preventing the lever from operating certain other shiftable elements.

A yet further object of the invention is to provide a latching mechanism for four speed transmissions to prevent the gear shift lever from operating the fourth speed while allowing movement of the lever for operation of other speeds.

Another and further object of the invention is to provide a latch mechanism for transmissions wherein the gear shift lever is normally arranged so that the same is incapable of effecting a given gear change while including means operable to render the lever capable of effecting said change under certain conditions.

A still further object of the invention is to provide mechanism in a transmission for rendering the gear shift lever ineffective to actuate a shiftable element without interferring with the actuation of other shiftable elements by the lever.

A further object of the invention is to provide a gear shift latch mechanism which is economical to manufacture, compact in form, sturdy in construction and certain in operation.

The above, other and further objects of the invention will be apparent from the following description, accompanying drawings and appended claims.

According to the invention a latch is mounted on the gear shift lever and is connected to mechanism within the gear set in such manner as to allow operation of the lever for ready selection of all of the gears in the gear set except the fourth gear and when the latch is operated the mechanism becomes effective to allow connection of the fourth gear in driving position with a locking of the lever against operation of any of the other gears of the gear set.

The form chosen to illustrate the invention includes an arrangement of slide or shifter rods for a four speed and reverse gear set or transmission with the low speed as the fourth gear. It is of course understood that any other gear may be the fourth gear or that under certain circumstances there may be more than one gear rendered normally ineffective by the latch mechanism for operation by the gear shift lever.

The chosen form of the invention is illustrated in the accompanying drawings and the views thereof are as follows;

Figure 1 is a vertical section through a gear shift lever and its mounting embodying the invention.

Figure 2 is an enlarged section taken on line II—II of Figure 1.

Figure 3 is an enlarged vertical section through the gear shift lever housing showing the latch mechanism in full lines in normal position and in dotted lines in the position assumed when the latch is actuated to allow the gear shift lever to engage the fourth gear.

Figure 4 is a horizontal section taken on line IV—IV of Figure 3.

Figure 5 is a section similar to Figure 4 showing the latch mechanism in the positions thereof when actuated to connect the fourth gear.

Figure 6 is a fragmental sectional view taken on line VI—VI of Figure 1.

The illustrated embodiment of the invention comprises the housing or gear shift lever support 1 having a bottom plate 2 therewith which is secured to the transmission or gear set casing and forms a top for said casing.

The housing converges upwardly and is provided at its upper end with a centrally disposed aperture 3 in which is formed a spherical surface 4.

The gear shift lever 5 comprises an enlargement 6 having a spherical surface for resting in the recess or seat 4 so that universal movement of the lever 5 may be accomplished in a manner well understood. The lever has a downwardly extending portion 7 which terminates in an end 8 arranged to cooperate with the slide rods carrying the forks which actuate the gears of this transmission.

There is a gear shift rod indicated at 9 and as shown provided with spaced ears 10 and 11 within which the end 8 of the gear shift lever engages for moving the rod axially to set up the gears controlled by the forks, not shown, attached to said rod.

The upper end of the gear shift lever 5 is shown as bent backwardly and terminates in a knob 12 which is threaded onto the upper end of the gear shift lever 5.

A hood 13 which is substantially semi-spherical in outline is attached to said gear shift lever 5 and overlies the ball 6 and the upper end of the housing 1 of the gear shift assembly.

A pin 14 passes through the ball 6 and extends into upwardly directed slots 15 in the upper end of the housing 1 so as to prevent rotation of the ball 6 as the handle 5 is manipulated.

The washer 16 bears against the underside of the ball 6 while a disk 17 rests against the underside of the washer 16. A spring 18 is interposed between the washer 17 and a collar 19 near the lower end of the portion 7 of the gear shift lever which spring acts normally to expand and thus to tightly hold the ball 6 in engagement with its seat 4 in the housing 1 to prevent rattling and also to aid in operation of the gear shift lever.

Figure 3 of the drawings shows a central shifter rod 9, a right hand shifter rod 20 and a left hand shifter rod 21, the three shifter rods being parallel and connected to forks, not shown, which actuate the gears in a manner well understood. Each of the rods 20 and 21 carries a collar 22 and 23 respectively, which collars have outstanding and laterally projecting lugs 24, between which lugs the end 8 of the gear shift lever engages as the same is manipulated to selectively engage one of the gears of the gear set. The collars 22 and 23 are secured to the respective shafts by set screws 25.

Two shafts 26 and 27 are supported in the housing 1 as shown in Figures 4 and 5 of the drawings, which shafts are parallel and arranged above the shifter rods 9, 20, and 21. The shafts 26 and 27 are parallel to the shifter rods. The shafts 26 and 27 have ends 28 thereof threaded for engaging threaded apertures in the housing 1, while the other ends of said shafts are provided with heads 29 for the reception of a proper tool for applying said shafts to the housing and fastening the same in position in said housing.

Shaft 26 supports a stop plate 30, which plate has sleeves 31 and 32 at each end thereof, which sleeves surround the shaft 26. An upturned ear 33 is formed at one end of the plate 30 while a projection 34 formed as a part of the sleeve 31, extends in an angular position with respect to the stop plate 30 for a purpose to be hereinafter more fully explained.

The shaft 27 is provided with a similar plate 35, which is supported on shaft 27 by sleeves 36 and 37 integral with or fastened to said plate 35. A projection 38 extends downwardly from the sleeve 36 for a purpose to be hereinafter explained.

A spring 39 is arranged on shaft 26 having a portion of the spring coiled about the shaft and with an intermediate portion looped for bearing against the housing 1 and with the free ends of the spring arranged to bear against the plate 30. The purpose of the spring 39 is to maintain the plate 30 in normal position which is that shown in Figures 3 and 4 of the drawings.

A similar spring 40 is arranged on shaft 27 which spring is likewise provided with an intermediate loop for bearing against the inner wall of the housing 1 with portions coiled about the shaft 27 and with the free ends thereof resting against the plate 35.

The plate 35 has an ear 41 extending downwardly from said plate.

The gear shift lever 5 is provided with a longitudinal bore 42 which extends throughout the inclined upper portion of the lever and passes outwardly through the ball 6 and has a lateral opening 43 adjacent the knob 12 of the lever. A flexible metallic member 44 is arranged within the bore 42 and is attached at its upper end to a finger latch 45. The upper end of the flexible member 44 is passed outwardly through the lateral opening 43 in the gear shift lever and then downwardly where it hooks into the latch 45. This arrangement secures the latch to the member 44 and at the same time the member 44 is effective to maintain the latch 45 against the gear shift lever. The latch has an integral collar 46 surrounding the gear shift lever and is slidable on said lever for a slight distance. The member 44 passes downwardly into the housing 1. The lower end of the member 44 is secured by a pivotal connection 47 to the upper ends of two arms 48 and 49, the other ends of which are fastened respectively to the ears 33 and 41 on the plates 30 and 35 respectively. The connections between the ears and the arms are pivotal connections made by pins or rivets 50. Preferably, the member 44 is a wire or rod although it may of course be of any other shape or material.

The full line showings the plates 30 and 35 and the connected parts illustrate the normal or inoperative position of these parts, that is the position when the latch 45 is in its downward or normal position and in which position the fourth gear is prevented from engagement by manipulation of the gear shift lever 5.

Figure 3 shows the plate 35 in substantially horizontal position in which position it is maintained by provision and arrangement of the spring 40 and the projection 38 as shown in Figures 4 and 6, bearing against the inner surface of the housing 1. The position of the plate 30 is normally downwardly, being maintained in such a position by the spring 39 in conjunction with the downwardly projecting portion 34 which bears against the inner surface of the housing 1 as shown in Figures 4 and 6. The springs 39 and 40 normally tend to maintain the parts in this position and through the plates and the connected arms 48 and 49 maintain the latch 45 in its lowermost position as shown in full lines in Figure 1. This arrangement of parts will, it is apparent, govern the movement of the gear shift lever 7 when the latch mechanism is in normal position. Reference to Figure 3 shows plate 35 extending horizontally so as to prevent movement of the portion 7 of the gear shift lever to the right and thus in engagement with shifter rod 21. The gear shift lever 7 is therefore allowed to move forwardly and backwardly and to have its lower end swung to the right as observed in Figure 3. This arrangement allows the gear shift lever 5 to set up any one of the gears controlled by the slide rods 9 and 20. It may be assumed for illustrative purposes that the slide rod 9 controls the second speed and the reverse while the slide rod 20 controls the third speed and the fourth or high speed. Movement of the gear shift lever in the manner well understood will engage any one of these four gears.

The retention of the plate 35 in a horizontal position prevents movement of the lower end 7 of the gear shift lever to the left as viewed in Figure 3, thus preventing its engagement with the fourth gear which is controlled by the slide rod 21. Should it be desired to engage the normally ineffective shifter rod 21 then the operator pulls up and holds the latch 45 thereupon raising the arms 48 and 49 to dotted line position in Figures 2 and 3, thus raising the plate 35 into vertical position as shown in dotted lines in Figures 2 and 3 and the plate 30 into horizontal position as shown in dotted lines in said figures. The width of plate 30 is greater than plate 35 so that when said plate is moved into horizontal position in the manner just described, it will swing the gear shift lever to the left as viewed in Figure 3 thus moving it into position to engage the shifter rod 21. The latch 45 is of course held in its upper position until the connection is made with the shifter rod 21 and its associated gear. The plate 30 it will be seen prevents movement of the lower end 7 of the gear shift lever to the right or even to such position as to engage the middle or intermediate slide rod 9. Hence when the latch 45 is raised to set up the fourth gear, the lever is locked against engagement with any of the other shifter or slide rods and the controlled gears of the gear set except the shifter rod 21 and its gear. The lever 7 is swung to the left as shown in Figure 3 to the dotted line position for engaging rod 21 and setting up the fourth gear controlled by slide rod 21. Should the latch 45 be released by the operator while the lever is still in engagement with the slide rod 21, the position of the lever in its dotted line position as shown in Figure 3 will prevent the return of plate 35 to its normal position and thus through the inner connecting arms 48 and 49 prevents plate 30 from moving downwardly, thus securely locking the gear set against accidental selection of a gear other than the fourth gear actuated by the slide rod 21.

The operator when he wishes to disengage the lever 5 from the shifter rod 21 will raise the latch 45 unless he has retained the same in uppermost position and move the lever so that the same will occupy the full line position of Figure 3 which is in neutral position. Movement of the lever to this position and release of the latch 45 will cause the springs 39 and 40 to return the plates 30 and 35 to normal or full line position of Figures 2 and 3. This position as before explained prevents engagement of the fourth gear by the lever, unless the latch 45 is manipulated as heretofore described.

It will be observed that this invention effectively prevents engagement of the lever with shifter rod 21 and its gear without manipulation of the latch and when the rod 21 and its gear is engaged by the gear shift lever, said lever is locked against engagement with any of the other shifter rods and their controlled gears of the gear set. This feature is a decided advantage as often times drivers will accidentally select a wrong gear with consequent damage to the vehicle or to its progress.

It will be observed that when the latched out shifter rod and its gear is set up, the lever is locked against engagement with any of the other rods and gears in the gear set with the result that when the lever is returned to engage any one of the other gears, the latched out rod and its gear is automatically latched. Operation of the latch moves the gear shift lever automatically into position to engage the latched out gear thus moving it out of engagement with any of the other gears of the set.

This invention has been illustrated and described in connection with a four speed reverse gear shift transmission. It is of course susceptible of use with a transmission of more or less than four speeds forward but is intended to be used in any kind of a gear shift arrangement wherein a latched out gear is employed.

The invention has been described herein more or less precisely, yet it is to be understood that changes may be made in the arrangement and proportion of parts and that equivalents may be substituted, all without departing from the spirit and scope of the invention.

I claim as my invention:

1. A gear shift latch mechanism including in combination, a gear set having a gear shift lever, said gear set having a plurality of shiftable elements arranged to be selectively engaged by said lever, certain of said elements being rendered normally ineffective from actuation by said lever, releasable latching means associated with said lever, a pair of swinging stops movable by said latching means, one of said stops being normally arranged to prevent engagement of said lever with said one element and the other of said stops arranged to be moved by said latching means for moving said lever into position to engage said one element, said latter stop being effective when in said unlatching position to prevent engagement of the lever with the remainder of said elements.

2. A gear shift latch mechanism including in combination, a gear set, said gear set including a plurality of shiftable elements, a pair of swinging stops arranged on each side of said lever, means for normally maintaining one of said stops in position to oppose movement of said lever into engagement with one of said elements, a latch associated with said lever and operatively connected to said stops, said latch being arranged that when moved into releasing position to move the second stop into such position as to move said gear shift lever into engagement with the said one element and to prevent engagement of said lever with the remainder of said elements.

3. A gear shift latch mechanism including in combination, a gear set, said gear set including a plurality of shiftable elements, a gear shift lever arranged to selectively engage any of said elements, releasable latching means associated with said lever, a swinging stop arranged to normally prevent movement of said lever into engagement with one of said elements, a second swinging stop arranged to move said lever into engagement with said one element when said releasable latching means are released, said latter means being effective to prevent engagement of the lever with the remainder of said shiftable elements when the latching means is released.

4. A gear shift latch mechanism including in combination, a gear set, said gear set including a plurality of shiftable elements, a gear shift lever arranged to selectively engage said elements, a releasable latching means associated with said lever, a swinging stop arranged to normally prevent movement of said lever into position to engage one of said elements, a second swinging stop arranged to move said lever into engagement with said one element when said releasable latching means is released, said latter means being effective to prevent engagement of the lever with the remainder of said elements when the latching means is released, and means for returning said stop and said latch mechanism to normal position.

5. A gear shift latch mechanism including in combination, a gear set including a plurality of shiftable elements, a gear shift lever, releasable latching means carried by said lever, said means including a latch slidably arranged on said lever and a connection passing through said lever connected at one end to said latch, a pair of swinging stops arranged near the lower end of said lever, arms connecting said stops to said member which is connected to said latch, said stops when in normal position being arranged so that one of the same opposes movement of the lever into position to engage one of said shiftable elements while allowing movement of the lever to engage any of the remainder of the shiftable elements, said other stop arranged on movement of said latch to move the lever into position to engage the one element and prevent the engagement of the lever with the remainder of said elements while the latching means is released.

6. A gear shift latch mechanism including in combination, a gear set having a plurality of shiftable elements, a gear shift lever, releasable latching means carried by said lever, said means including a latch slidably arranged on said lever and a connection passing through said lever connected at one end to said latch, a pair of swinging stops arranged near the lower end of said lever, arms connecting said stops to said member which is connected to said latch, said stops when in normal position being arranged so that one of the same opposes movement of the lever into position to engage one of said elements while allowing movement of the lever to engage any of the remainder of the elements, said other stop arranged on movement of said latch to move the lever into position to engage the said one element and prevent engagement of the lever with the remainder of said elements while the latching means is released, and means for returning said parts to normal position.

7. A transmission including in combination, a gear shift lever, a support for said lever, a slidable latching element connected to the lower end of said lever, a swingable plate associated with said support and disposed in the path of movement of the lower end of said lever for limiting lateral movement of the lower end of said lever in one direction, and means carried by said lever for rendering said plate ineffective to allow movement of the lower end of said lever in said one direction.

8. A transmission including in combination, a gear shift lever, a support for said lever, a slidable latching element connected to the lower end of said lever, swinging plates associated with said support for limiting lateral movement of the lower end of said lever, and means for rendering said plates ineffective to allow greater range of movement of the lower end of said lever, said last mentioned means including a rod extending through the lever and projecting beyond the lower end of the same.

9. A transmission including in combination, a gear shift lever, a support for said lever, a slidable latching element connected to the lower end of said lever, a horizontal hinged plate associated with said support for limiting lateral movement of the lower end of said lever, means for rendering said plate ineffective to allow greater range of movement of the lower end of said lever, said last mentioned means including a rod extending through the lever and projecting beyond the lower end of the same, and means connected to the upper end of said rod for effecting movement thereof in a direction to render said lever limiting means ineffective.

10. A transmission gear set in combination, a gear shift lever, a plurality of shiftable elements for selective engagement by said lever, a swinging plate normally disposed in the path of movement of the lower end of said lever to prevent engagement of said lever with one of said elements, a spring for maintaining said plate in normal position, and connections on said lever for swinging said plate out of normal position to allow movement of said lever into engagement with said one element.

11. A transmission gear set in combination, a gear shift lever, a plurality of shiftable elements for selective engagement by said lever, means for normally preventing engagement of said lever with a selected one of said elements, means for moving said first mentioned means out of normal position to allow movement of said lever into engagement with said selected element, a swinging plate normally maintained away from said lever, a spring for maintaining said plate in normal position, means for moving said plate out of normal position, said second mentioned means being effective to move said plate into position to prevent engagement of said lever with the other shiftable elements while said lever is in engagement with said one selected element.

12. A transmission gear set in combination, a gear shift lever, a plurality of shiftable elements for selective engagement by said lever, a swinging plate normally disposed to prevent engagement of said lever with a selected one of said elements, means for swinging said plate away from said lever to allow engagement thereof with said selected element, a second swinging plate associated with said first plate in such manner that as said first plate is moved away to allow engagement of said lever with said selected element said second plate is moved into position to prevent movement of said lever into engagement with any of the other shiftable elements, and means on said lever for actuating said plates.

In testimony whereof I have hereunto subscribed my name at Detroit, Wayne county, Michigan.

ROBERT LESLIE MAPSON.